United States Patent Office 3,178,406
Patented Apr. 13, 1965

3,178,406
NITRATES OF 5-ACYL-IMINODIBENZYLS AND THEIR PRODUCTION
Robert Albrecht, Arlesheim, Basel-Land, Henri Dietrich, Birsfelden, near Basel, and Fridolin Hefti, Riehen, near Basel, Switzerland, assignors to Geigy Chemical Corporation, Ardsley, N.Y., a corporation of Delaware
No Drawing. Filed Dec. 21, 1961, Ser. No. 161,250
Claims priority, application Switzerland, Dec. 22, 1960, 14,297/60, 14,298/60
5 Claims. (Cl. 260—239)

The present invention concerns new nitrates and nitro derivatives of 5-acyl-iminodibenzyls, as well as processes for the preparation of same. These compounds are valuable intermediate products for the synthesis of the corresponding 3-amino compounds, which have antioxidant properties. These amino compounds can also be used as intermediate products for the synthesis of pharmaceuticals.

On nitrating dibenzoheterocyclic compounds having an imino group as heterocyclic ring member such as carbazole, phenoxazine and phenothiazine, first one or two nitro groups enter into one or both benzene nuclei in the para-position to such imino group, in the case of phenothiazine mono-oxidation of the sulphur atom occurs simultaneously. This disposition to occupy the para-position is further increased on acylation of an amino or imino group.

Surprisingly it has now been found that 3-nitro-5-acyl iminodibenzyl compounds of the Formula I

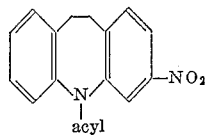

(I)

wherein "acyl" is an acyl radical, e.g. a lower alkanoyl radical as for instance acetyl, propionyl, isobutyryl, butyryl, valeroyl or isovaleroyl and furthermore a radical of an aromatic acid as for instance benzoyl can be produced by treating a 5-acyl-iminodibenzyl, e.g. 5-acetyl-iminodibenzyl, with substantially the equimolar amount of nitric acid in sulphuric acid. The nitro group in this reaction enters into the meta position of the acylimino group of the condensed heterocyclic ring system.

For the nitration, 5-acetyl-iminodibenzyl for example, or another 5-acyl-iminodibenzyl is dissolved in ten to twenty times its weight of concentrated sulphuric acid and 0.9–1 mol of concentrated nitric acid (40° Bé.) per mol of 5-acyl-iminodibenzyl in concentrated sulphuric acid are added dropwise at temperatures between about −10° and +10° C., preferably between about 0° and about +5°. The crude product, obtained by precipitation from the reaction solution with ice, is subjected to fractional crystallisation, e.g. from benzene, ethanol or methanol, whereupon 3-nitro-5-acyl-iminodibenzyl is obtained. The 3-nitro-5-acetyl-iminodibenzyl crystallises as colourless prisms which melt at 157–158°.

(The aforementioned process is also disclosed and is claimed in copending application Serial No. 390,991, filed Dec. 24, 1964, as a continuation-in-part of the present application.)

The same nitro compounds of Formula I can also be produced by converting a 5-acyl-iminodibenzyl by careful reaction at a temperature between about 0° and about 25° with nitric acid into its nitrate of the Formula II

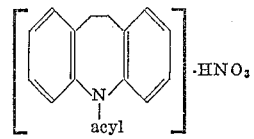

(II)

wherein "acyl" has the meaning given above, and treating the latter with sulphuric acid at low temperature.

To form the nitrate, for example 5-acetyl-iminodibenzyl or another 5-acyl-iminodibenzyl is dissolved, for example in twice to five times the amount by weight of glacial acetic acid or 80% acetic acid and the equimolar amount or an excess of nitric acid is added dropwise at about 0–30°, preferably at about 0°. The nitrate which precipitates is filtered off under suction and, if desired, recrystallised, e.g. from chloroform or liberated from 5-acyliminodibenzyl, which has also precipitated, by treatment with warm (up to 50°) cyclohexane. The nitrate of 5-acetyl-iminodibenzyl crystallises as colourless prisms which melt at 104–105° (from chloroform) or at 108–110° (from acetic acid). However, it decomposes at temperatures above 70°.

For the conversion into a 3-nitro-5-acyl-iminodibenzyl, the corresponding nitrate is dissolved, e.g. at 0°–20°, in about ten times the amount by weight of concentrated sulphuric acid. On adding ice to the reaction mixture, the crude 3-nitro-5-acyl-iminodibenzyl precipitates and can be purified as described above.

The 3-nitro-5-acyl-iminodibenzyls are reduced advantageously by means of iron and acetic acid or hydrochloric acid according to Béchamp; however, other reduction processes such as, e.g. treatment with zinc and acetic acid and also catalytic hydrogenation e.g. in the presence of Raney nickel can also be employed.

3-amino-5-acyl-iminodibenzyls, in particular 3-amino-5-acetyl-iminodibenzyl, are valuable intermediate products for the production of iminodibenzyl derivatives which can be used for therapeutical purposes as they can be diazotised and the diazonium salts can be converted into 3-substituted iminodibenzyls and iministilbenes such as, for example, the 3-chloro-, 3-bromo-, 3-hydroxy- and 3-methoxy- derivatives. From these, substances having particular psychopharmacological properties e.g. antidepressive activity, are obtained, for example, by introduction of dialkylaminoalkyl radicals into the 5-position, e.g. the γ-dimethylaminopropyl radical or γ-dimethylamino-β-methylpropyl radical.

Up to now, e.g. 3-amino-5-acetyl-iminodibenzyl has been produced from iminodibenzyl by a rather long chain of reactions, namely acetylation to the 5-acetyl-iminodibenzyl, introduction of the 3-acetyl group into the latter by means of acetyl chloride in the presence of aluminum chloride in carbon disulphide, conversion of the 3,5-diacetyl-iminodibenzyl obtained into 3-acetamido-5-acetyl-iminodibenzyl by treatment with hydrazoic acid according to Schmidt, and hydrolytic liberation of the 3-amino group with retention of the 5-acetyl radical.

The nitrates and nitro derivatives of 5-acyl-iminodibenzyls according to the invention represent therefore easily accessible intermediate products for the production of the above-mentioned 3-amino-5-acyl-iminodibenzyls.

The following examples further illustrate the processes according to the invention without restricting the invention to the given examples. Parts are given as parts by weight and the relationship of parts by weight to parts by volume is as that of grammes to cubic centimetres.

Example 1

237 parts of 5-acetyl-iminodibenzyl are dissolved at room temperature in 3500 parts of concentrated sulphuric acid and a mixture of 95 parts of nitric acid 40° Bé. (0.95 mol) and 400 parts of concentrated sulphuric acid is added dropwise to the solution while stirring at 0–5°. The reaction solution is stirred for 30 minutes at 0° and then poured into about 6000 parts of ice. The crystals which precipitate are filtered off under suction and washed neutral with water. The moist filter product is dissolved in 1000 parts by volume of benzene, the water is removed and 500 parts by volume of the benzene solution are distilled off. The solution which remains is cooled to 5°, the precipitated crystals are filtered off under suction, washed with a little cold benzene and dried. About 112 parts of 3-nitro-5-acetyl-iminodibenzyl (40% of the theoretical) are obtained. The product can also be worked up by dissolving the moist filter residue in 1000 parts by volume of hot 95% ethanol or hot methanol, then distilling off 500 parts by volume of the solvent, letting the concentrated solution stand at about 20°, filtering off the precipitated crystals under suction and washing with a little ethanol or methanol and drying. The yield of pure substance is the same as that obtained by the first method.

The pure 3-nitro-5-acetyl-iminodibenzyl melts at 157–158°, recrystallised from benzene, ethanol or methanol.

Example 2

In an analogous manner, starting with 251 parts of 5-propionyl-iminodibenzyl, M.P. 68–70°, instead of the 237 parts of 5-acetyl-iminodibenzyl in Example 1, 3-nitro-5-propionyl-iminodibenzyl is obtained, which can be recrystallised from ethanol or methanol, and which melts at 165–166°.

Starting with 299 parts of 5-benzoyl-iminodibenzyl, M.P. 126–127°, the product obtained is 3-nitro-5-benzoyl-iminodibenzyl, M.P. 178–180°, and starting with 279 parts of 5-isovaleroyl-iminodibenzyl, M.P. 66–67°, the product obtained is 3-nitro-5-isovaleroyl-iminodibenzyl, M.P. 115–116°.

Example 3

(a) 237 parts of 5-acetyl-iminodibenzyl are dissolved at room temperature with stirring in 550 parts of 80% acetic acid. 237 parts of nitric acid 40° Bé. are added dropwise within 30 minutes at 0–25° and the whole is stirred for another 30 minutes. The crystals are filtered off under suction and washed neutral with water. To remove starting material, the moist filter cake is well stirred into 250 parts by volume of cyclohexane at 40°, again the crystals are filtered off under suction, washed with cyclohexane and dried at 40° in vacuo whereupon 285 parts of 5-acetyl-iminodibenzyl nitrate (95% of the theoretical) are obtained.

(b) 300 parts of 5-acetyl-iminodibenzyl nitrate are dissolved at 0° while stirring in 3600 parts of concentrated sulphuric acid and the solution obtained is poured into about 4500 parts of ice. The crystals which precipitate are filtered off under suction and washed neutral with water.

To work up the product, the moist filter cake is dissolved in 1200 parts by volume of hot 95% ethanol or hot methanol, then 600 parts by volume of the solvent is distilled off and the concentrated solution is left to stand at 20°. The crystals which precipitate are filtered off under suction, washed with a little ethanol or methanol and dried. About 165 parts of 3-nitro-5-acetyl-iminodibenzyl (58% of the theoretical) are obtained.

The compound so obtained melts at 157–158°, showing no depression in a mixed melting point determination with a sample of the compound obtained in Example 1.

The product can also be obtained by dissolving the moist crude product in 1200 parts by volume of benzene, removing the water, distilling off 600 parts by volume of benzene, cooling the concentrated solution to 5°, filtering off the precipitated crystals under suction, washing them with a little cold benzene and drying.

Example 4

In an analogous manner to Example 3, starting with 251 parts of 5-propionyl-iminodibenzyl instead of the 237 parts of 5-acetyl-iminodibenzyl in Example 3, 3-nitro-5-propionyl-iminodibenzyl, M.P. 165–166° (identical with the compound obtained in Example 2) is obtained via the crude nitrate of 5-propionyl-iminodibenzyl.

Example 5

The use of the nitro compounds according to the invention as intermediate products for the preparation of the corresponding amino compounds is illustrated by the following example:

255 parts of iron filings are etched in 500 parts of water with 20 parts by volume of 80% acetic acid at reflux temperature, 282 parts of 3-nitro-5-acetyl-iminodibenzyl are added in portions whereupon the reaction mixture is refluxed for about 6 hours. After cooling, 30% caustic soda lye is added until the reaction is phenolphthalein alkaline whereupon the crude 3-amino-5-acetyl-iminodibenzyl is exhaustively extracted with benzene. The benzene extract is concentrated to 1000 parts by volume and the reaction product is allowed to crystallise out on slowly cooling. It is filtered off under suction, washed with a little cold benzene and dried. About 225 parts of 3-amino-5-acetyl-iminodibenzyl (M.P. 151–153°) are obtained (90% of the theoretical). This compound shows antioxidant properties.

In an analogous manner, starting with 296 parts of 3-nitro-5-propionyl-iminodibenzyl (Example 2 or 4) instead of 282 parts of 3-nitro-5-acetyl-iminodibenzyl, 3-amino-5-propionyl-iminodibenzyl is obtained.

What we claim is:

1. Nitrates of 5-acyl-iminodibenzyl of the formula

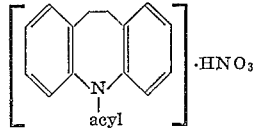

wherein acyl is a member selected from the group consisting of acetyl, propionyl, butyryl, isobutyryl, valeroyl, isovaleroyl and benzoyl.

2. Nitrate of 5-acetyl-iminodibenzyl.

3. Nitrate of 5-propionyl-iminodibenzyl.

4. Process for making nitrate salt of 5-acyl-iminodibenzyl comprising dissolving 5-acyl-iminodibenzyl in acetic acid, adding 40° Bé. nitric acid equal in weight to said iminodibenzyl to said solution at a temperature of about 0–25° C., said addition effected dropwise in about 30 minutes, separating the resultant nitrate crystals from the reaction mixture, and washing said crystals.

5. Process for making 3-nitro-5-acyl-iminodibenzyl comprising reacting nitrate salt of 5-acyl-iminodibenzyl with concentrated sulfuric acid at about 0° C., whereby crystalline 3-nitro-acyl-iminodibenzyl is obtained.

References Cited in the file of this patent

UNITED STATES PATENTS 3,056,774    Dietrich et al. _____ Oct. 2, 1962

FOREIGN PATENTS 820,476    Great Britain _____ Sept. 23, 1959

OTHER REFERENCES

Degering: Organic Nitrogen Compounds, pages 134 and 311 (1950).